United States Patent
Tippetts et al.

(10) Patent No.: US 6,402,820 B1
(45) Date of Patent: Jun. 11, 2002

(54) FLUIDIC LEVEL CONTROL SYSTEMS

(75) Inventors: John R. Tippetts; Geoffrey H. Priestman, both of Sheffield (GB)

(73) Assignee: The University of Sheffield, Sheffield (GB)

( * ) Notice: Subject to any disclaimer, the term of this patent is extended or adjusted under 35 U.S.C. 154(b) by 0 days.

(21) Appl. No.: 09/602,197

(22) Filed: Jun. 22, 2000

Related U.S. Application Data

(63) Continuation of application No. PCT/GB98/03801, filed on Dec. 22, 1998.

(30) Foreign Application Priority Data

Dec. 23, 1997 (GB) .............................................. 9727078

(51) Int. Cl.$^7$ .............................................. B01D 19/00
(52) U.S. Cl. ...................... 96/157; 969/173; 969/183; 969/184; 969/193; 137/187; 137/810; 137/811; 137/812; 137/813
(58) Field of Search ........................... 95/24, 241, 243, 95/254, 259; 96/155, 156, 157, 174, 183, 184, 193, 195; 137/187, 810, 811, 808, 812, 813

(56) References Cited

U.S. PATENT DOCUMENTS

| | | | |
|---|---|---|---|
| 685,497 A | * | 10/1901 | Tonkin |
| 2,610,697 A | * | 9/1952 | Lovelady et al. |
| 2,610,698 A | * | 9/1952 | Lovelady et al. |
| 4,355,652 A | * | 10/1982 | Perkins |
| 4,422,476 A | | 12/1983 | Blanchard .................. 137/810 |
| 4,730,634 A | * | 3/1988 | Russell |
| 5,203,890 A | * | 4/1993 | Tatsuo |
| 5,254,292 A | | 10/1993 | Gabryelczyk et al. ........ 261/76 |
| 5,437,799 A | * | 8/1995 | Kissler |
| 5,524,665 A | | 6/1996 | Kolpak ....................... 137/173 |
| 5,597,492 A | | 1/1997 | Felder ......................... 210/787 |
| 6,251,167 B1 | * | 6/2001 | Berson |

FOREIGN PATENT DOCUMENTS

| | | |
|---|---|---|
| DE | 2431112 A1 | 1/1976 |
| DE | 2712444 A1 | 9/1978 |
| EP | 0009335 A1 | 8/1979 |
| EP | 0530967 A2 | 3/1993 |
| GB | 1193089 | 5/1970 |
| GB | 2207257 A | 1/1989 |

OTHER PUBLICATIONS

BP Exploration, Partial Processing Guidelines, (Feb. 1996).
Flood Protection of Vortex Valves, De H. Brombach GmbH (Dec. 1996).
Priestman, G.H. et al., "Development and Potential of Power Fluidics for Process Flow Control," *Chem. Eng. Res. Des.*, 62:67–80 (Mar. 1984).

* cited by examiner

*Primary Examiner*—Duane S. Smith
(74) *Attorney, Agent, or Firm*—Sheldon & Mak; Robert J. Rose

(57) ABSTRACT

A system for separating a liquid and a gas including a separation vessel (30) with an inlet (28) for a gas/liquid mixture. Outlets (40, 42) for the fluids are disposed at different heights in the vessel. The outlets are controlled by turn-up vortex amplifiers (fluidic valves TuVAs) that include a supply port (40, 42), a control port (36, 38) and an outlet port (48, 50). The control port is supplied from the vessel at an intermediate level between the outlets, so that a change of flow in the control port alters resistance to flow through the valve.

40 Claims, 13 Drawing Sheets

FLUIDIC LEVEL CONTROL SYSTEMS

CROSS REFERENCES TO RELATED APPLICATIONS

This application claims priority from Great Britain Patent Application No. 9727078.9, entitled "FLUIDIC LEVEL CONTROL SYSTEMS", filed on Dec. 23, 1997, and is a continuation of International PCT Patent Application No. PCT/GB98/03801, entitled "FLUIDIC LEVEL CONTROL SYSTEMS", filed on Dec. 22, 1998, which are incorporated herein by reference.

BACKGROUND

This invention relates to a method and system to control the level of a liquid in a pressurised vessel or at least in a reservoir in which a pressure difference exists between the fluid above the liquid whose level is being controlled and an outflow of the liquid from the reservoir. This invention finds particular application in a fluid separation system to separate immiscible fluids of different density. The invention also relates to an improved fluidic valve.

In the petroleum extraction industry, but also elsewhere, there is frequently a requirement to separate different density immiscible fluids such as oil and water or oil and gas or all three. Indeed such mixtures may be found in large volumes and often in rapidly varying ratios of one component with respect to the other. A major problem associated with such multiphase flow is the fact that the constituent parts of the flow are extracted at a variable rate, such that in operation there is poor control over, for example, the amount of gas followed by the amount of liquid obtained from the well. This sometimes results in what is known as "slugging flow", which can cause control problems.

Partial processing is a system where coarse separation of the various components is effected adjacent a well site, or other location near where the mixed components requiring separation first emanate. This results in much reduced transportation costs. In the petroleum extraction industry, for example, water and oil are frequently combined products of an oil well, and while the oil is to be recovered and transported to a refinery, the water is to be reused for pressurising the well. Consequently, to transport the water to a refinery and then back to the well is wasteful.

However, separation is not straightforward. As mentioned above, there are wide variations in the ratio of one component with respect to the other. Secondly, there is frequently solid matter entrained in the flow, which also need separation and isolation. Thirdly, the separation may need to be performed sub-sea, or in a remote site, where system reliability becomes of paramount importance. Gravitational separation in a vessel is possible, using a weir system for example, but maintaining the different levels of the components in the vessel is problematic when widely varying in-flow of the components occurs. Then, it is necessary to control the outflow of the components so that an appropriate interface level between the components is maintained. However, a simple weir system to maintain a level cannot function if there is a pressure difference between the less dense fluid and the outflow of the dense fluid. In this event there is the danger that the difference will simply result in forcing of the less dense fluid through the dense fluid outflow.

Pressure variation which the vessel may occur as a result of changes to the inflow rate, or alternatively, from variations to the outflow rate for one or more of the fluids in the system.

It is therefore important to maintain steady-state levels of, for example, oil, gas and water in the vessel so that separation of the fluids can be adequately controlled. Pre-separation of an oil-water steam allows the use of more compact downstream equipment. Further benefits of partial processing include the reduction of bottlenecking in the vessels and an increased yield from new and mature sites.

As mentioned above, another problem associated with production of oil and gas is sediment, which has to be removed from the fluid phase, but poses the added problem of obstructing outlets, and causing wear and stress on the component parts of systems with which is comes into contact.

Fluidic valves are known and have various design possibilities employing vortices or other properties of fluid flow to control flow from an input to an output.

It is known to employ vortex valves, which are commonly referred to as vortex amplifiers, and which comprise a vortex chamber, input and output ports, and a control port. The control port is tangential to the vortex chamber and induces a vortex in the chamber when there is flow through it. The input and output ports are generally arranged axially and/or radially with respect to the vortex chamber, one at least being on the circumference of the vortex chamber so that vortex flow in the chamber interfaces with flow into or from the circumferential port. Where a conical vortex chamber is employed, the input and output can be aligned so that resistance to flow, when there is no control port flow, is minimised.

DE-A-2431112 discloses such a valve employed to control the outflow of flood retention reservoirs. A radial main flow to an axial outflow is controlled by two tangential control ports opposing one another. The first port is supplied with flow when the level of the reservoir rises above a low level, thereby tending to reduce flow through the valve from the radial input to the axial output. The second control port is supplied with flow when the level of the reservoir rises above a high level. In this event, the flows through the control ports cancel one another's effect and the valve reverts to low resistance. Thus, as the reservoir rises from a minimum level to a maximum level, the valve starts with a low resistance because there is no flow through the control ports. The valve switches to high resistance when the first control port receives a flow as the reservoir level rises above that control port's input. Finally, the valve switches back to low resistance when the reservoir fills to its maximum level and the other control port is provided with flow as its input is flooded by the rising reservoir level.

However, a problem associated with this arrangement is that the valve is trying to maintain a fixed outflow rate despite changes in the driving hydrostatic head as set by the reservoir level. The valve is not, therefore, suited to level control where a high resistance to flow is required at a low liquid level while low resistance is required at levels above target.

Another problem with the double control vortex amplifier arrangement is that at low liquid levels the vortex chamber can very easily entrain gas and operate partly filled with gas. If the reservoir is pressurized, or suction applied to the outflow, the valve may be prone to the gas venting through one or more of the control ports and this could be highly undesirable in many chemical processing situations.

GB-A-1193089 disclosed a vortex valve having an axially arranged outlet port, two tangential control ports and subsequently no other ports such that inflow to the valve is through the control ports and outflow is through the outlet, the control ports being opposed to one another to reduce any vortex formation when flow occurs through both control ports from a common pressure source.

EP-A-0009335 discloses a T-junction modulator having a divided mainstream flow path to either side of the modulator and two control cylinders to oscillate a control flow across the modulator to inhibit mainstream flow therethrough.

It is therefore an object of the present invention to provide a system in which the level of a liquid in a pressurised chamber can be controlled so that the aforementioned problems are overcome, or at least their effects are mitigated within the design limits of the system.

It is a further object of the invention to provide a fluid separation system incorporating such a level control system.

It is moreover, an object of a different aspect of the present invention to provide a novel form of fluidic valve, suitable for use in level control and/or separation systems in accordance with the present invention or otherwise.

SUMMARY

According to the first mentioned objective, the invention therefore provides a pressure vessel containing a reservoir of fluid and having a valve controlling an outlet of the vessel and wherein there is a pressure differential across said valve beyond any hydrostatic pressure head of the reservoir fluid, the vessel comprising a system for the control of the level of reservoir fluid in the reservoir, the system comprising said valve being a fluidic valve and having an outlet port and at least two control ports either or both of which control ports may serve to inlet fluid into the fluidic valve, the inlets being arranged at different levels in the reservoir, whereby the valve has resistance to flow to fluid therethrough which is controlled by flow of said fluid into the control ports, such that said resistance is minimised when flow of fluid in the control ports is substantially equal, and wherein the flow out of the outlet is substantially equal to the combined flow into each control port.

Preferably, said valve is a vortex amplifier comprising a vortex chamber, said control ports being tangential with respect to said chamber and opposed with respect to each other, such that, when the fluid in the reservoir is between said levels, a vortex flow is induced in the vortex chamber increasing its resistance to flow, whereas when the fluid is outside said levels, flow through each control port is substantially the same so that no vortex is established in the vortex chamber whereby the resistance to flow through the valve is minimised.

Preferably, more than two control ports are provided around said vortex chamber. Moreover, at least two of said control ports may be tangential in the same direction, their inlets in the reservoir being at different levels so that there is gradual switching between maximum and minimum resistances to flow through the valve and vice versa.

The valve may have two axially opposed outlet ports, or may have an adjustable needle-valve disposed in the valve so that it protrudes into the outlet port restricting outflow rate.

Preferably, the valve is arranged such that the pressure in one control port is at least 90%, preferably 95%, and more preferably 99%, of the pressure in the other port.

Alternatively, said valve may comprise a T-junction modulator, wherein a radial diffuser has the narrow end of two conical diffusers, forming said control ports, communicating with said radial diffuser substantially centrally thereof and on opposite sides thereof, said outlet port communicating with a collection gallery around said radial diffuser, whereby absence of supply of fluid to one control port results in oscillation of fluid across said radial diffuser and a high resistance to flow through the valve.

In any event, preferably the control port, whose inlet is nearest the fluid level when both control ports have flow therethrough, is of sufficiently large diameter substantially to eliminate any risk of entrainment of an adjacent fluid in the flow of said reservoir fluid to the valve along said control port.

Preferably, the valve has no other ports than said control and outlet ports. Moreover, the control ports are preferably adapted to permit substantially equal, opposing flows within the vortex chamber to reduce any vortex formation, when said control ports are supplied from a common pressure source. The valve may be located internally of the vessel.

In accordance with the further object of the present invention, said fluid level control system may be employed in a fluid separation system for separating immiscible, different-density fluids, the system comprising a separation vessel with an inlet for said fluids, an outlet for each fluid disposed at different levels in the chamber, and a level control system as defined above, wherein one of said control ports is one of said outlets and the other of said control ports is supplied from the vessel at a level intermediate said outlets, so that a change in level of the boundary between said fluids in the vessel about said intermediate level results in a change in the balance of flow in said control ports to alter the resistance to flow of fluid through the valve.

The fluid level control system may be disposed in a separate level control chamber connected to the separation vessel both above and below the level of the interface between said fluids.

Preferably, in such a separation system, said fluids are a liquid and a gas, the vessel further comprising a second fluidic valve, the first valve controlling outflow of the liquid and the second valve controlling outflow of the gas.

Said first and second valves may have different intermediate levels and each intermediate level may be located between the control ports of the other valve.

There may be three fluids, being two liquids and a gas, in which event, the system may further comprise an intermediate fluidic valve, said first valve being a dense phase valve controlling outflow of the denser of said liquids, said intermediate valve having a supply port intermediate the supply and control ports of the first valve and a control port above the control port of the first valve.

Preferably, the separation system further comprises a shroud around that control port of the or each valve which is nearest said intermediate level when there is balanced flow through both control ports, the shroud being disposed at a level so that only fluid of the same density as the fluid entering the other control port is able to enter the shrouded control port.

The separation vessel may comprise a cyclone separator comprising a substantially circular cylindrical housing whose inlet is tangentially arranged so as to impart swirling flow on the mixed fluids entering the separator.

In one arrangement, a separate level control chamber is provided incorporating a level control system as herein defined, the control chamber being supplied at different levels with gas and liquid partially separated in said cyclone separator.

Preferably, however, the control system is disposed within the cyclone separator, and comprises a substantially circular cylindrical shroud centrally positioned in the cyclone separator so that swirling flow is outside said shroud, the shroud being apertured and one control port of the valve extending up the shroud.

More preferably, however, the level control system is disposed within the cyclone separator, and comprises a control port pipe defining with the wall of the separator an annular control space, swirling flow in the separator being substantially confined to the interior of said pipe and one control port of the fluidic valve being supplied with liquid from inside the pipe, while the other port is supplied with liquid spilling over the pipe and into the annular space. In this event, the annular space may be closed off around part of its circumference to direct flow from the inlet into the interior of the pipe.

The current invention has the capability of handling solids in the fluid phase because fluidic valves have no moving parts which might jam. Moreover, abrasive wear is far less of a problem in fluidic valves than valves with moving parts.

This invention therefore provides a means of controlling the fluid interface in a separator vessel as used for gas/liquid separation with the advantages of:
 (i) being able to recover rapidly from "blow out" or "flood" conditions in the separator vessel, should that occur;
 (ii) substantially eliminating the need to replace damage and worn components because the controlling valve perform their function with no moving mechanical parts; and,
 (iii) not requiring any power and operating entirely automatically.

It will also be appreciated that an important aspect of the present invention is its ability to accommodate the contents of the vessel or reservoir being pressurised substantially above the pressure at the outlet of one or more of the valves. Moreover, it is capable of accommodating enhanced gravity systems. In either case the reason is because the arrangement depends primarily on the level of fluid in the reservoir, and not the forces acting on it. The only limitation is the relative pressure above the reservoir with respect to the outside. If this gets too high, blow-out is a possibility and so the system needs to be designed so that, within the design limits of the system, blow-out does not occur.

In accordance with the further aspect of the objectives of the present invention, there is provided a turn-up vortex amplifier, comprising a vortex chamber, one or two axially arranged outlet ports, two or more tangential control ports and substantially no other ports such that inflow to the valve is through the control ports and outflow is through the or each outlet, at least two of the control ports being opposed to one another to reduce any vortex formation when flow occurs through both control ports, and in which an adjustable needle-valve is disposed in the valve so that it protrudes into the outlet port restricting outflow rate.

Such valve preferably has some or all of the features mentioned above in relation to the system aspects of the present invention, which features are applicable to the valve itself.

In a further aspect of the present invention, there is also provided a turn-up vortex amplifier comprising interconnected control, manifold, vortex and outlet plates defining axially arranged inlet control ports, a distribution manifold, a vortex chamber and an axially arranged outlet port respectively.

Preferably, said control plate has a first control port which is centrally arranged, and a plurality of second control ports which are spaced around said central port.

Preferably said vortex plate comprises a plurality of antechambers spaced around said vortex chamber, each with a jet passage tangentially arranged with respect to, and connecting with, the vortex chamber in a direction depending on to which of said first and second control ports said antechambers are connected.

Preferably said manifold plate has a central distribution chamber on one side thereof, which side faces said control plate, radially spaced lumens leading off said distribution chamber and connecting with axial passages communicating with said other side of the manifold plate. Preferably, said manifold plate also has an annular equalisation chamber on said other side, and which is supplied by through-passages communicating one with each of said second control ports.

DRAWINGS

The invention is further described with reference to the accompanying drawings of specific embodiments of the invention, which are given as non-limiting examples, in which:

FIG. 5a is a schematic diagram of a system in accordance with the present invention, while FIG. 5b is a graph of flow rate through a TuVA as liquid level changes in the system of FIG. 5a;

Figure 19:
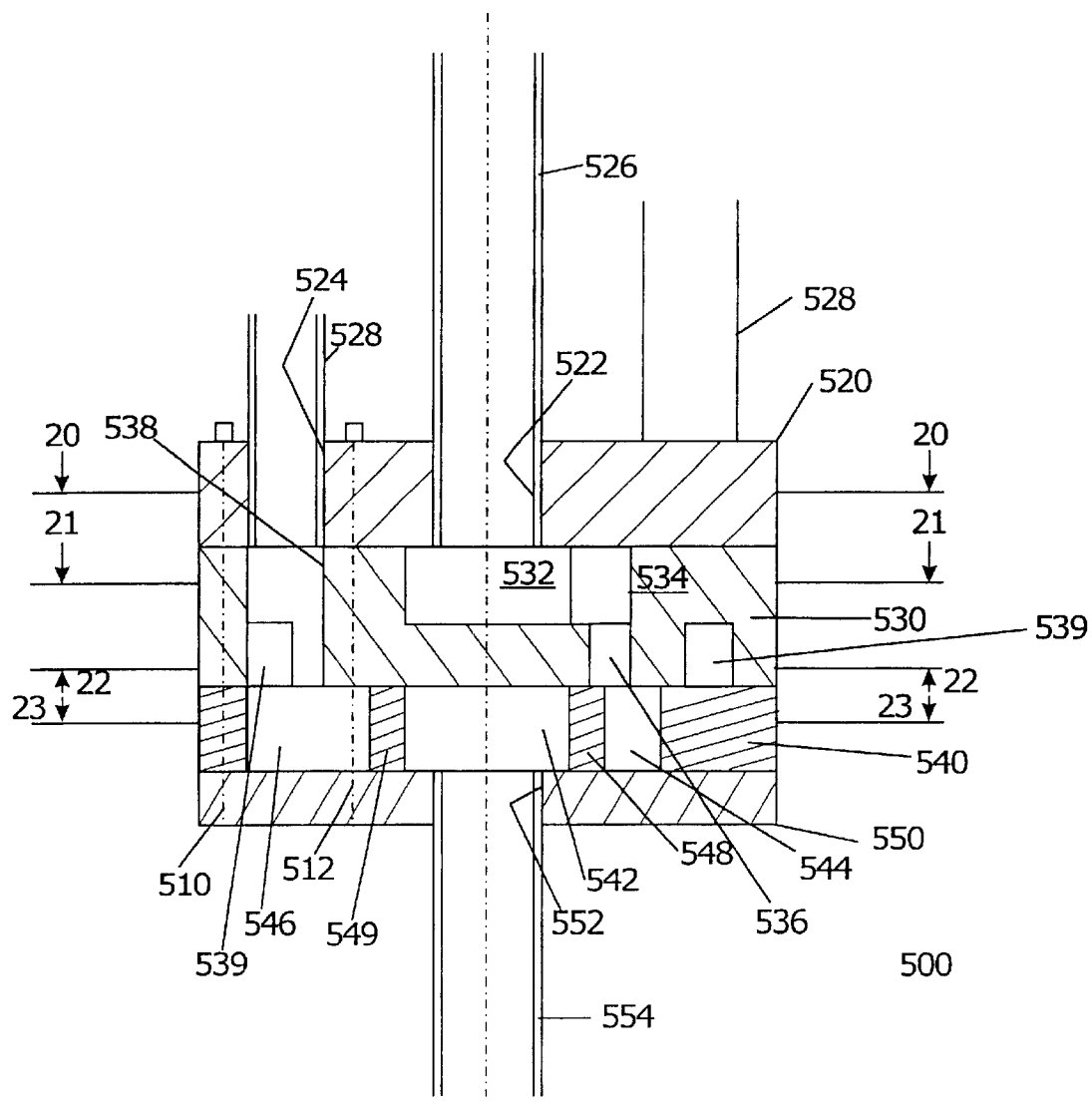
Figure 20:
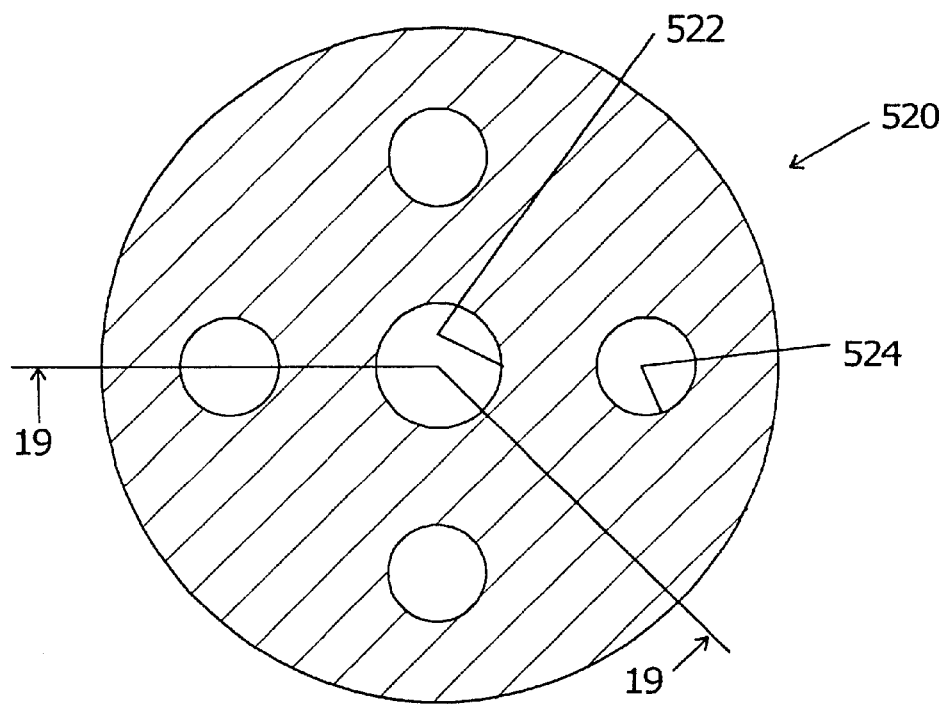
Figure 21:
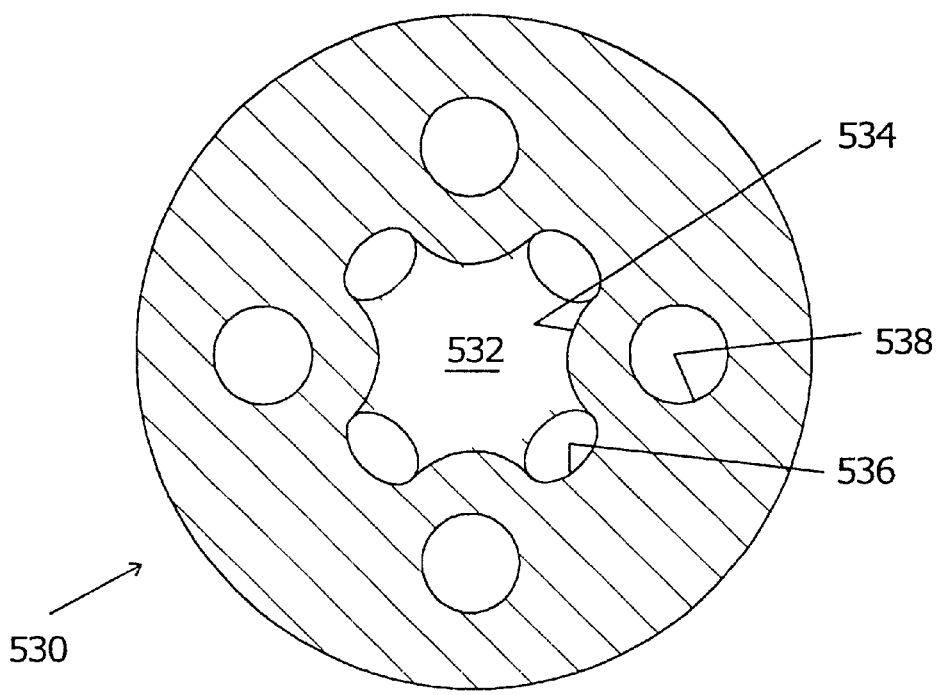
Figure 22:
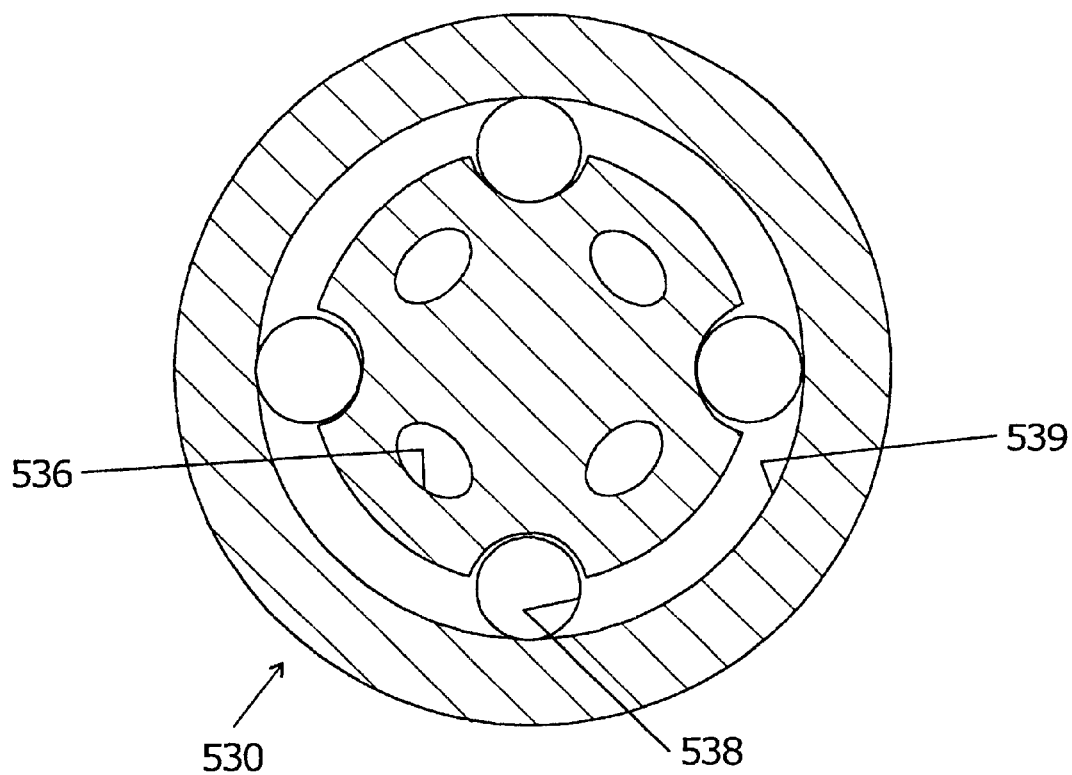
Figure 23:
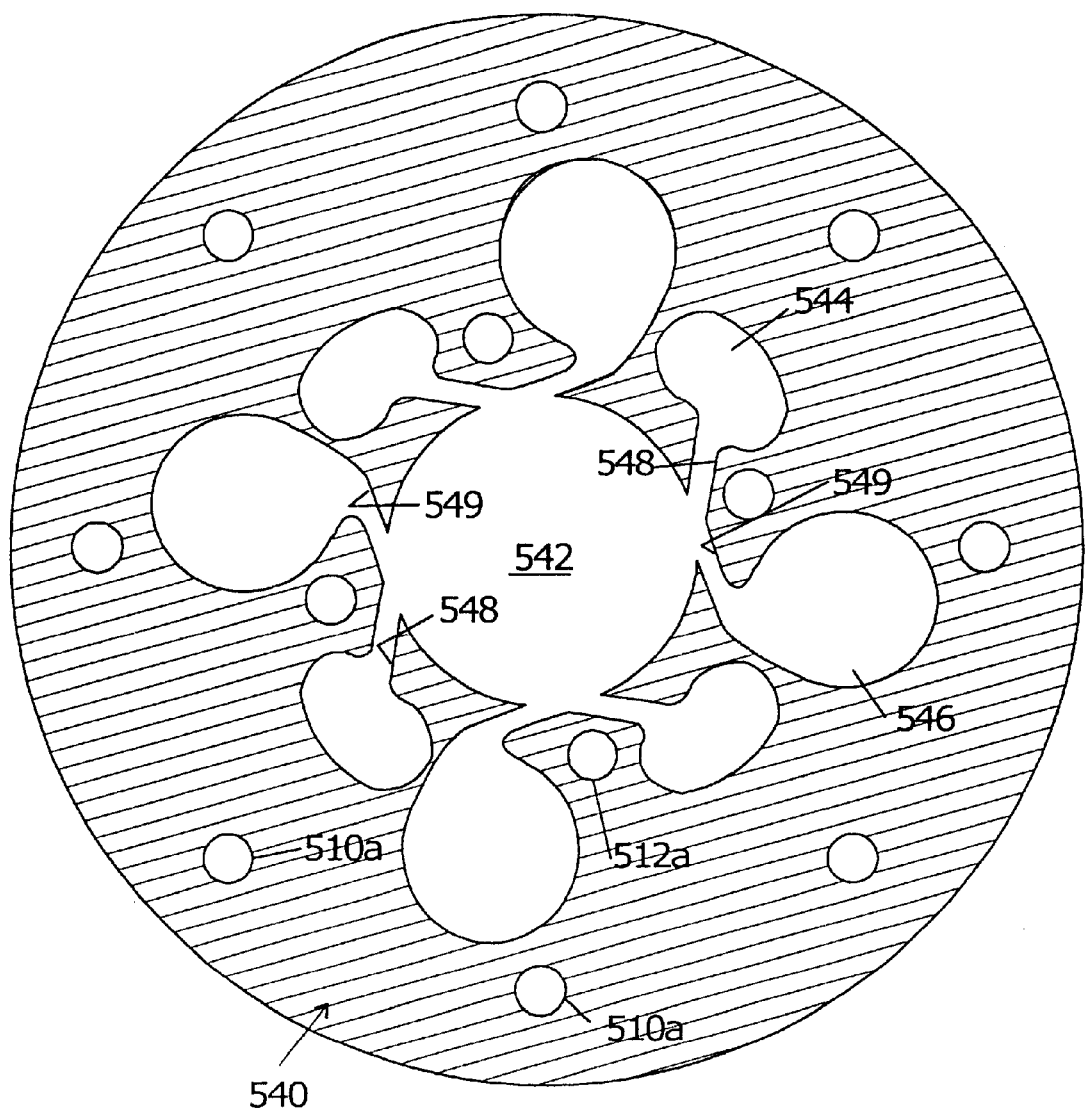

FIG. 19 is a section on the line 19—19 in FIG. 20 through a construction of a TuVA in accordance with the present invention; and FIGS. 20 to 23 are sections along the lines 20—20, 21—21, 22—22 and 23—23 in FIG. 19.

DETAILED DESCRIPTION

Figure 1:
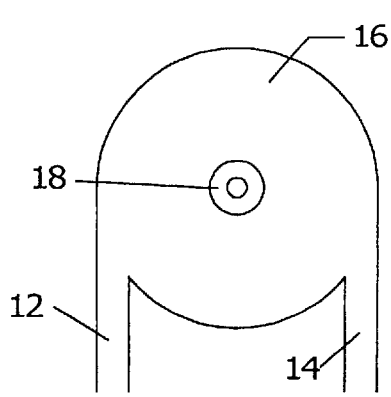
FIG. 1 is a front elevation of a basic design for a simple turn-up vortex amplifier (TuVA)

Referring to FIG. 1 of the drawings, a turn-up vortex amplifier (TuVA) 10, comprises a vortex chamber 16, and two control ports 12,14, hereinafter referred to as a supply port 12 and a control port 14 for ease of identification. Both ports are tangential to the vortex chamber. The axial outlet 18 may be conically shaped, as shown, with a circular outlet increasing in diameter with distance from the vortex chamber, so as to reduce pressure losses, although the shape of the axial outlet would be governed by design requirements. For example a radial diffuser may also be employed.

When fluid flow enters solely through the supply port 12, it passes into the vortex chamber 16 where a fluid vortex forms which impedes the passage of the flow into the outlet port. There is therefore a high resistance to the flow exiting the outlet port and the rate of flow through the valve is reduced to a minimum value, $Q_{min}$, for a given fluid level or pressure drop across the valve.

The pressure in the control port, as determined by the pressure resulting from pressure recovery in the vortex state, is only slightly below the pressure in the supply port 12. On the other hand, should the pressure in the control port 12 rise to equate with that in the control port 14, fluid enters the supply and control ports equally, such that flow passes into the vortex chamber 16 in tangentially opposing directions so that the vortex effect is negated. In this instance flow passes to the outlet port with minimum resistance and the flow rate is maximised to $Q_{max}$, again, at the given level or pressure drop.

Figure 2:
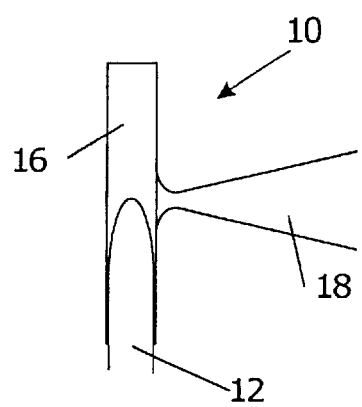
FIG. 2 is a side elevation of the TuVA of FIG. 1.
Figure 3:
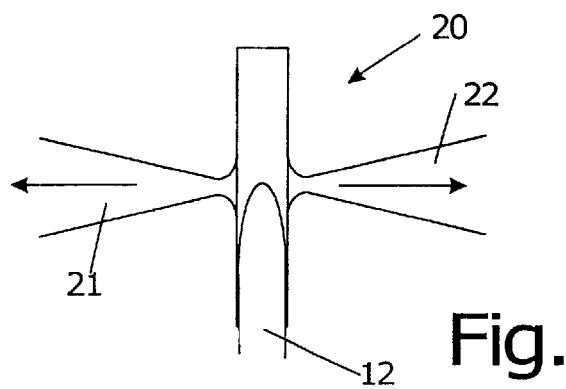
FIG. 3 is a variation of FIG. 2, showing a TuVA with two axially opposed outlets.

FIG. 2 illustrates a side view of the TuVA of FIG. 1. FIG. 3 shows an alternative embodiment for altering the performance of a TuVA wherein TuVA 20 is fitted with two axial outlets 21 and 22, shown here in alignment. The presence of two axially opposed outlets may increase the ratio $Q_{max}/Q_{min}$. It should be noted that other features of the valve geometry also influence the valve' performance including the use of conical or radial diffusers (not shown).

The TuVA tangential inlet, outlet, and control ports, and chamber periphery can also be designed and configured to maximise pressure recovery in the vortex state.

Figure 4:
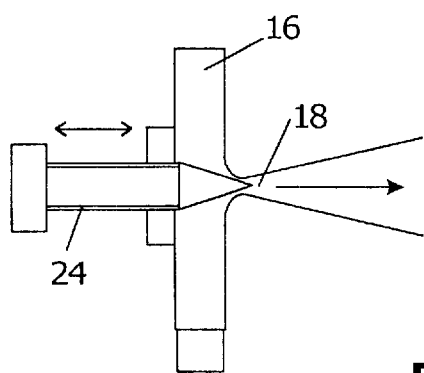
FIG. 4 is another variation of FIG. 2, employing a needle valve arrangement to FIG. 2.

A further modification is depicted in FIG. 4, wherein an adjustable needle valve arrangement 24 is disposed so that it passes through the vortex chamber 16 and into the mouth of the outlet port 18, thereby controlling the exit hole area. The presence of the needle valve enables a valve of a basic given geometry to be fine-tuned in order to provide a specific flow performance and, for example, be able to be switched between high and low flow rates for a specific setting or even be closed completely.

The pressure differential which exists between the inlet port and the centre of the vortex chamber wall, changes as the valve switches from a minimum to a maximum outflow state. This pressure differential can therefore be used to monitor the valve in operation or even as a control signal to another component of the system responsible for another inflow or outflow stream.

Figure 5A:
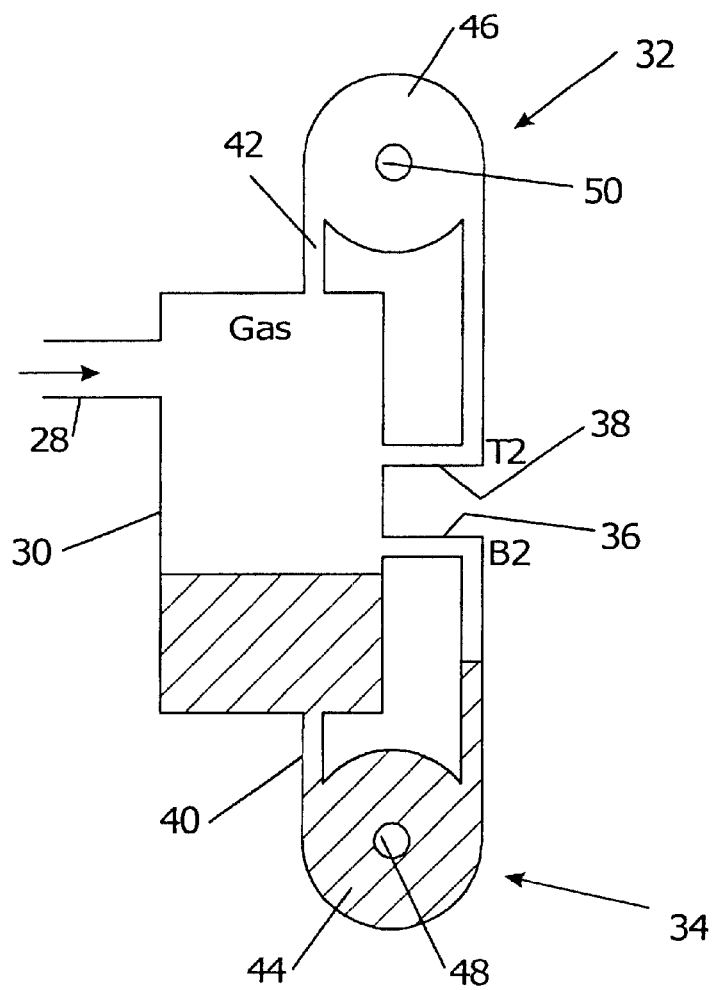

FIG. 5a shows a fluid level control system in accordance with the present invention, wherein a multiphase inlet port 28 feeds into a separating chamber 30 holding gaseous and liquid layers. Two outflows 40,42 are controlled by two TuVAs 34,32 respectively. The upper TuVA 32 controls gaseous outflow from the gas layer, while the lower TuVA 34 controls the liquid outflow. Each TuVA has a vortex chamber 44,46 and an axial outlet port 48,50. The resistance to flow through each of the two TuVAs is dependent upon the in-flow state of their respective control ports 36,38.

When the level of the liquid in the chamber is below the entrance level of the control port 36 of the lower TuVA 34, the liquid only passes through the supply port 40 of the TuVA, inducing a vortex in its chamber 44 and impeding the flow of liquid out of liquid outlet 48. On the other hand, gas can escape the vessel 30 through both the supply port 42 and control port 38. If the supply and control ports are of equal size, no vortex will be established in TuVA 32 and so it will have minimum resistance to gas flow to its outlet 50. Consequently, assuming that the flow inlet is within the design parameters of the separator and the TuVAs are dimensioned and designed accordingly, the level of liquid in the vessel 30 will rise until it reaches the control port inlet 36.

When the level of liquid in the chamber 30 rises above the inlet to control port 36, liquid enters the lower TuVA 34 via both the supply 40 and control ports 36. This cancels out the vortex effect in the lower TuVA so that liquid flows out of chamber 30 through TuVA 34 and out through flow outlet valve 48 at a maximum rate. Should the level of liquid in the vessel continue to rise, however, perhaps because there is a greater than normal liquid content in the flow inlet 28, until the level of liquid in the chamber 30 rises above the level of the control port 38 to the upper TuVA 32. This enables maximum flow of liquid through the lower TuVA 34, as described above, but impedes gas entering the control port 38 to the upper TuVA and only allows the flow of gas through the supply port 42. This establishes a vortex in chamber 46 of the TuVA and reduces the flow of gas out through gaseous outlet 50 until the level of liquid in the chamber again falls below control port 38 again. Consequently, the level in the vessel 30 is regulated between the two ports 36,38.

Figure 5B:
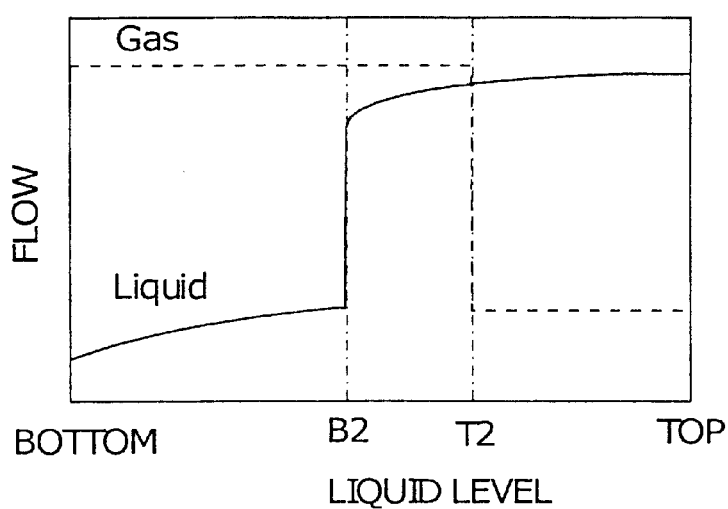

The variation in the liquid and gas flows, as a function of the level of liquid in chamber 30, is schematically represented in FIG. 5b. At low liquid levels, the gas flow rate through the upper TuVA (broken line) remains constant at a maximum value. The liquid flow is at a minimum (solid line) but rises slowly as the liquid pressure head increases. When the liquid level reaches control port 36, gas flow is substantially unchanged, but liquid flow increases dramatically. Finally, when liquid level reaches control port 38, liquid flow is substantially unchanged, rising slightly as the liquid pressure head increases, but gas flow drops significantly. Any increase in pressure in the vessel due to the reduced gas outflow would of course tend to increase the outflow of both fluids. It should be noted, however, that even during steady state conditions, the gas and liquid flows may be very different, in absolute terms, and the TuVAs will be sized accordingly.

Figure 6:
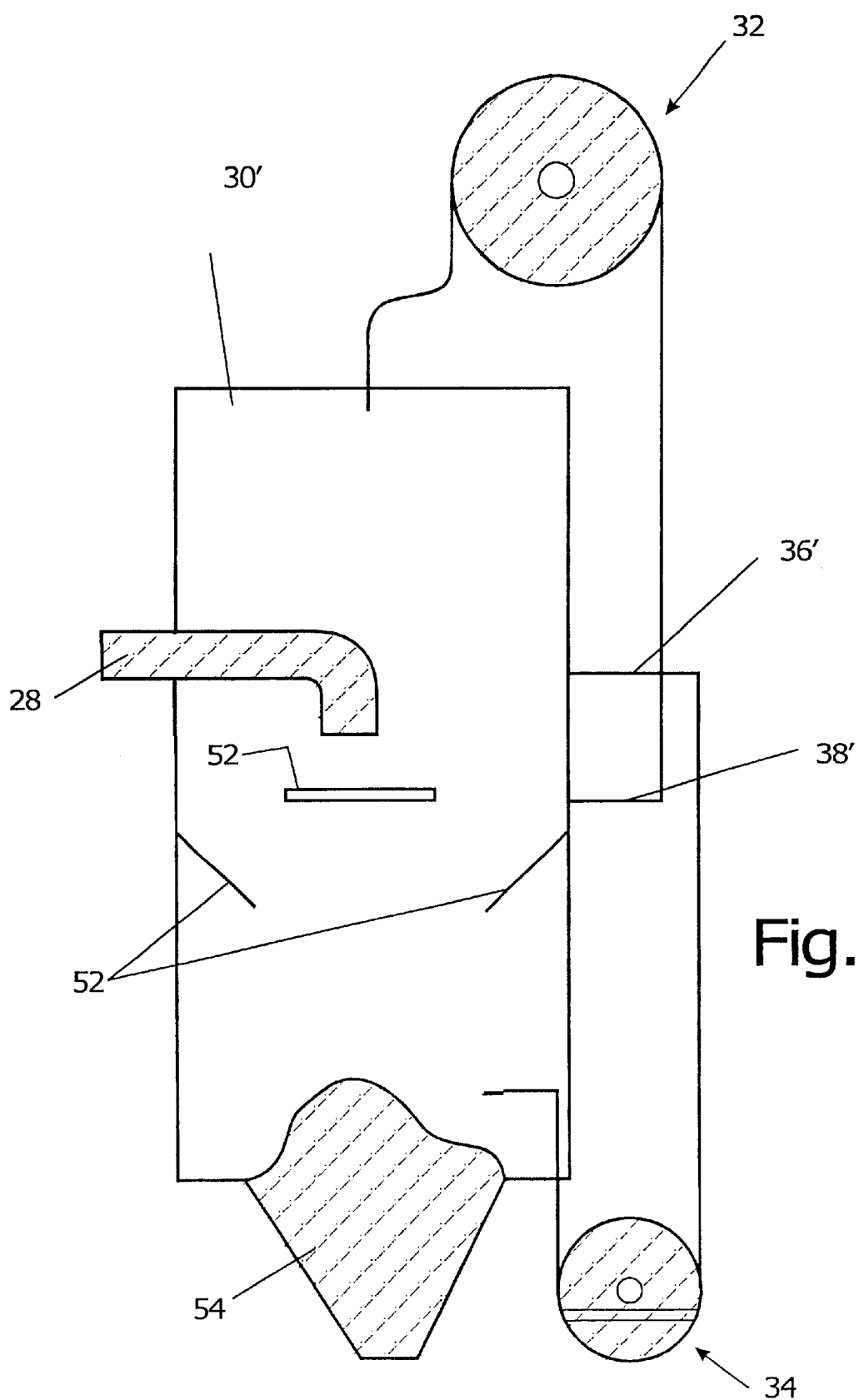
FIG. 6 is a variation of the system of FIG. 5, to accommodate sediment entrained in the multiphase flow.

A more responsive system in illustrated in FIG. 6. This is achieved by swapping the positions of ports 36', 38' in chamber 30', so that there is always one TuVA in an imbalanced, high flow-resistant position. FIG. 6 also shows the application of baffles 52 and a sand trap 54 for separating and isolating sediment in the multiphase in-flow 28.

Figure 7:
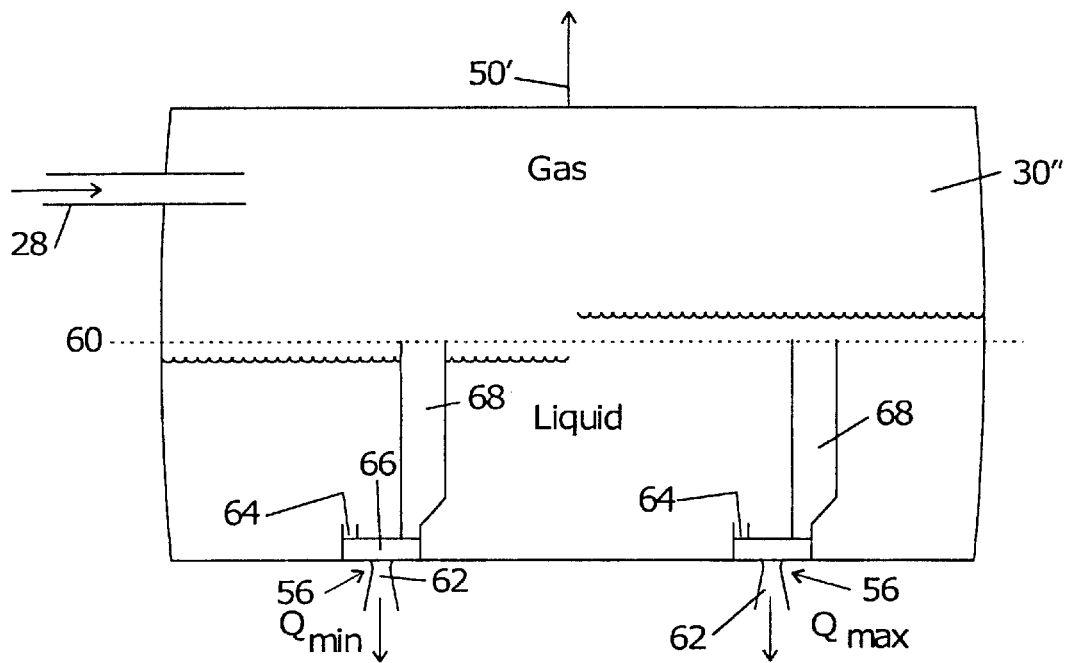
FIG. 7 is a further schematic diagram of a system similar to that shown in FIG. 5.

FIG. 7 illustrates the use of a single TuVA 56 to control a gas/liquid interface about a control level 60 in a horizontal separator vessel 30" (two TuVAs are shown purely to illustrate the two flow conditions, $Q_{min}$ and $Q_{max}$ of the TuVA). Here, the gas outflow through outlet 50' is pressure regulated only, by means not shown; which means that the vessel 30" is under gas pressure greater than the ambient pressure residing outside the liquid outflow 62 of the TuVA 56. Consequently there is a gas pressure drop across the control port 68/vortex chamber 66/outlet 62 when the liquid level is as shown on the left on FIG. 7. Since, however, as discussed further below, the pressure in the control port 68 at the vortex chamber 66 is only slightly less than the supply port 64 pressure at the vortex chamber (i.e., about 95% or more thereof), then the level of the liquid in the control port is only slightly lower than the level in the rest of the vessel. This is important to ensure that gas does not force its way down the control port into the vortex chamber and out of the outlet 62. Indeed, the bore of the control port is enlarged so that, should the level of the liquid in the vessel oscillate about the control level 60, slugs of gas will not get pushed into the vortex chamber by liquid over-spillage into the control port when the level in the vessel rises.

The arrangement of the pipes connected to the supply and control ports needs to be carefully selected in order to avoid, or at least minimise, the risk that oscillation of the flow becomes established through dynamic interaction between the pipe and TuVA characteristics. Such oscillation would tend to reduce the effective flow ratio $Q_{max}/Q_{min}$.

Such oscillation may be avoided, or at least reduced, by designing the valve to operate with a maximum flow state corresponding to opposing vortex flows entering the chamber which are not quite substantially equal, such that the fluid vortex is not quite fully eliminated. A reduction in the volume of the vortex chamber such that multiple parallel valves are required to accommodate the required total outflows of the fluid stream under control may also reduce oscillation.

Incidentally, if TuVAs are mounted, as shown in FIGS. 7 to 10, internally of the vessel, then this reduces the pressure rating requirement of the equipment and also the number of vessel penetrations. Consequently, this arrangement is preferred. Also, if the valves are mounted in the orientation shown in FIG. 7, for example, the possibility of gas entrainment is reduced because the inlets to the vortex chamber are uppermost.

The liquid level will thus be maintained close to the required control level 60 for all liquid inflows between $Q_{max}$ and $Q_{min}$.

As the liquid in-flow rate increases from $Q_{min}$ to $Q_{max}$ the TuVA controller 56 operates in the non-vortex state for a greater fraction of the operating time. The controller therefore behaves as a "no-moving part variable size outlet" from the vessel, with the result that any tendency for the liquid interface level to rise about the desired control level 60 will automatically lead to an effective increase in the size of the liquid outlet orifice.

One example of the ratio between the maximum and minimum out-flow rates of $Q_{max}$ and $Q_{min}$ which can be achieved using fluidic valve controllers is of the order of 4:1 and possibly more.

Another application for this type of interface level control exists in a vessel with a constant stream inflow rate, but with a variation in the pressure differential across one or more of the controller outflow streams. When the fluid inflow rate is constant and the downstream outlet pressure is also constant, it is possible to accommodate a pressure range within the vessel in the order of 16:1 and possibly more.

This feature may find particular application where the safe operation of vessels containing fluids under pressure is of paramount importance.

It will be further appreciated that a greater flow range can be achieved if a much larger variation to the interface control level is allowable. This greater degree of freedom results in changes to the effective pressures at the tangential inlets due to changes in the hydrostatic head of the liquid in the vessel. Ultimately, an increased control range can be obtained at the expense of increased level variation.

Figure 8:
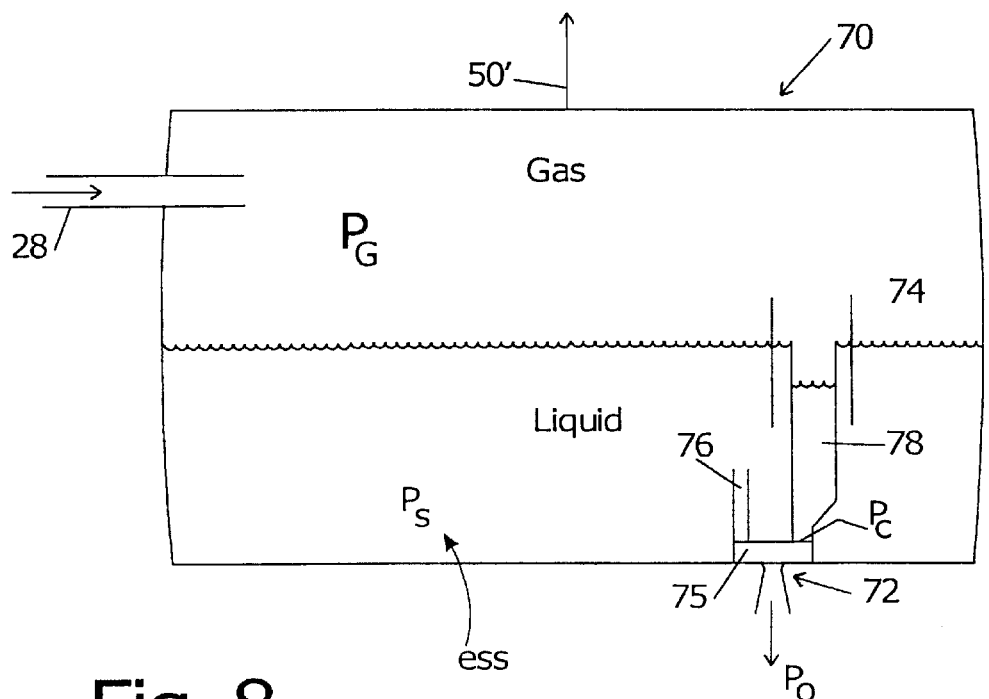
FIG. 8 shows the use of a TuVA in a gas/liquid separator with a shrouded control pipe arrangement.

A further embodiment of the fluidic level controller as applied to a separator vessel is seen in FIG. 8. A separator vessel 70, fitted with an internal fluidic level controller 72 is additionally supplied with a shrouded control pipe arrangement 74. The shroud 74 ensures that the fluid entering both the inlet port 76 and the control port 78 of the vortex chamber 75 is fed from a common fluid level within the vessel.

Figure 9:
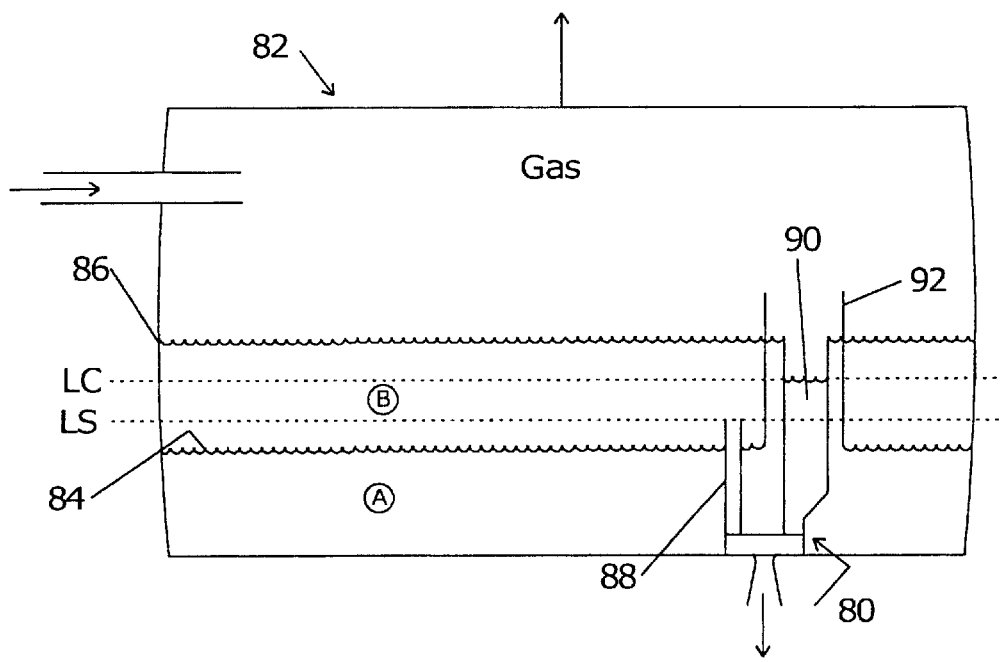
FIG. 9 shows the use of a TuVA for maintaining a gas-liquid interface containing two immiscible liquids, both of which flow out through a single control valve.

A further application for fluidic level control systems is illustrated in FIG. 9, where a control valve 80 is used to maintain the gas-liquid interface in a separating vessel 82 containing two immiscible, different density liquids A & B, both of which are required to pass through a single control valve 80.

In this situation there is observed two interfaces, a liquid-liquid interface 84 and a liquid-gas interface 86 determined by a liquid-liquid control level LS and liquid-gas control level LC respectively. When the level of the liquid-liquid interface 84 is above the inlet port 88, only liquid A is drained through the valve 80. Even if the liquid-gas level rises above the level of control port 90, still only liquid A drains, because shroud 92 has its level below the level of the supply port 88. Only when the liquid-liquid level drops below the level of supply port 88 does liquid B drain through port 88. Liquid B can only drain through both ports when the liquid-liquid level is below the base of the shroud of control port 90 if the liquid-gas interface is still above the level of the control port 90.

Although the arrangement described above does control the two interfaces to the levels LC and LS as shown, at least in respect of the liquid-liquid interface, there is no "servo" assistance in the draining of either liquid with respect to the other should their respective inflow vary. There is only the overall servo assistance with respect to the liquid-gas interface.

Figure 10:
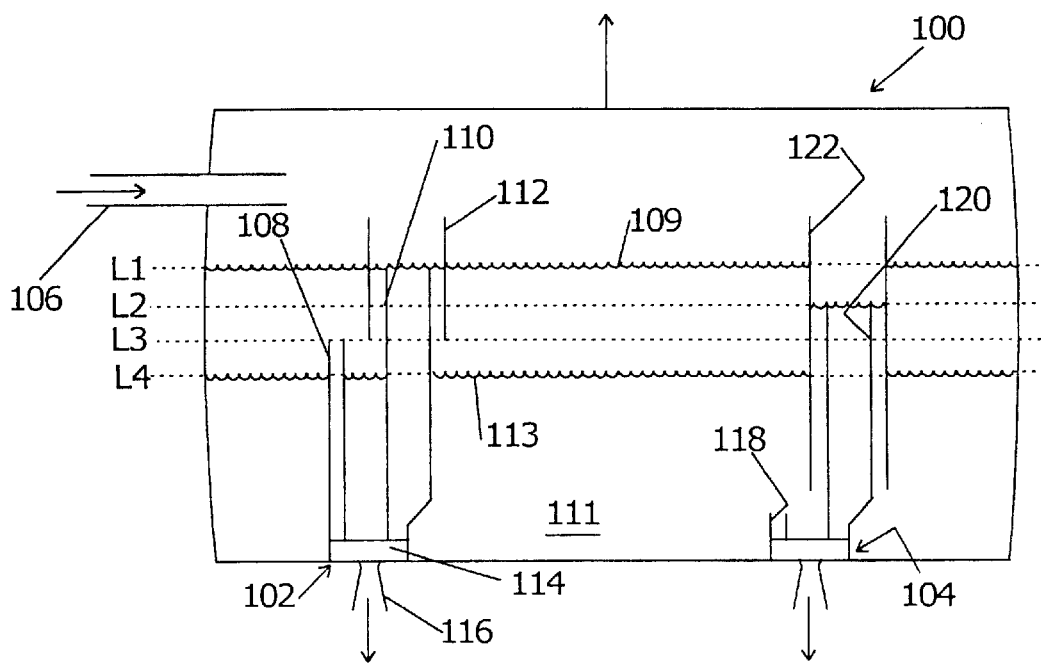
FIG. 10 shows two TuVA's controlling and maintaining the fluid levels in a gas/oil/water gravity separator.

This position is addressed in the embodiment of FIG. 10 in which multiple TuVAs control the separation of an inflow of gas mixed with two immiscible liquids. A typical example is in the oil extraction industry in a gas/oil/water gravity separator 100. The separator 100 has two TuVA's 102,104 mounted internally of the gravity separator.

The water/oil/gas mixture enters the gravity separator vessel 100 through inlet port 106 above the liquid levels and into the gaseous phase. TuVA 102 is arranged so that supply port 108 extends through the water phase 111 into the oil phase, and the entrance to the control port 110 lies at the interface 109 between the oil and gas layers. The control port 110 is shielded by control shroud 112 which surrounds the control port 110 and bridges both the oil and gas layers.

When the oil layer increases above the entrance to the control port 110 (at level L1) oil passes down the control port, into the vortex chamber 114 where it negates the vortex effect of oil passing into it through the supply port 108 and out through the axial outlet 116.

A similar situation pertains with the TuVA 104, for which supply port 118 is in the eater phase 111 and the control port 120 is just below the level of control port 110 (at level L2). Again a control shroud 122 protects control port 120 ensuring that only water from phase 111 enters the control port, regardless of the levels of the components in the vessel 100, at least within design limits. However, the level of control port 120 being below port 110 means that water is drained under servo conditions when the gas/liquid interface rises before the oil phase is so-drained. This serves to keep the water/oil interface 113 low in the vessel (at about level 4) and below the oil supply port 108 (at level L3) so that there is little danger of water spilling into the oil TuVA 102 and its outflow 116. However, if the liquid/gas interface drops to the level of supply port 108, then gas will be able to escape into the oil outlet and consequently, while this embodiment has improved liquid/liquid level control, the design limits are narrower. The relative position of the inlets to ports 108 and 120 is important in the determination of whether gas or water would pass into port 108 if the oil flow ceases.

Figure 11:
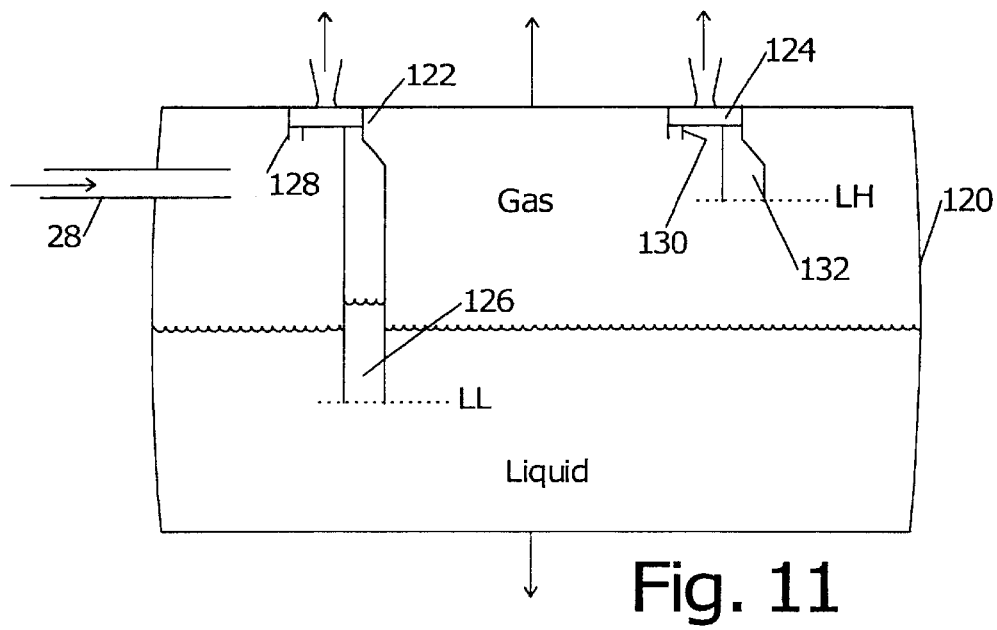
FIG. 11 shows a variation in accordance with the present invention in which it is a gas outflow which is controlled by TuVAs.

In FIG. 11 a fluidic valve arrangement is used to control the gas outflow from a gas-liquid separator 120 wherein two control valves 122,124 are configured internally of the separator, each demonstrating an alternative mode of operation.

Fluidic valve 122 is arranged such that the valve normally operates in the minimum outflow state such that the control port 126 is blocked by liquid when the level of the liquid is above control level LL. Consequently, gas only enters the control valve via supply port 128. When the level of liquid falls below control level LL, this allows valve 122 to operate in a maximum outflow state permitting a rise in liquid level, which is in any event encouraged by the reduction in the gas pressure in the vessel, caused by the maximum gas outflow, and so that the liquid outflow rate is reduced.

Fluidic valve 124 is arranged to operate such that the valve normally operates in the maximum outflow state. If the level of liquid in the separator rises above a pre-set upper liquid level, denoted by LH, then this closes the opening to the control port 132 and the valve switches to a minimum outflow state through supply port 130. This serves not only to restrict gas escape, so that the liquid level drops back again, but also to increase further the gas pressure in the separator so tending to increase the rate of the liquid outflow.

When the fluidic gas valves 122, 124 operate together as a primary interface level controller, they are designed so that the gas-liquid interface is normally located intermediate the levels LL,LH.

A gas phase fluidic valve can be used to control all or part of the gas outflow. Furthermore, it can be used in conjunction with other outflow valves, either fluidic or conventional, on either the gas or liquid outflows. For example, there would be nothing to prevent the arrangements of FIGS. 9 or 10 being combined with the arrangement in FIG. 11.

Figures 12, 13:
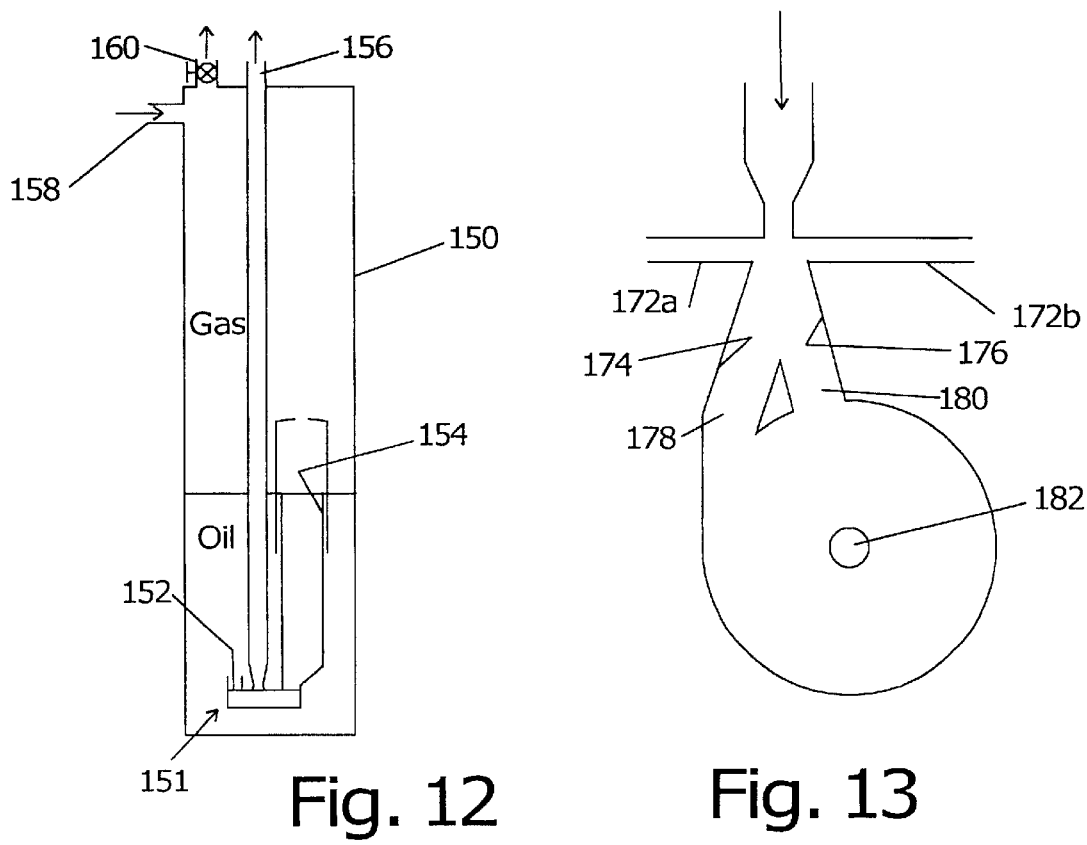
FIG. 12 shows in side elevation a vertical Caisson separator controlled by a TuVA.
FIG. 13 shows a coanda switched vortex amplifier (CSVA)

Another application of fluidic valves is shown in FIG. 12, wherein a vertical caisson separator 150 employs a TuVA 151 to control the oil level. TuVA 151 comprises a tangential supply port 152, tangential control port 154 and axial outflow 156. A multiphase flow enters the separator 150 through inlet port 158 and liquid separated from the fluid mixture is removed through the central axial cut-flow 156 under pressure.

Caisson pressure is maintained by means of a back pressure control valve 160.

In FIG. 13 there is shown a coanda vortex amplifier (CSVA). In operation, a fluid phase applied across control ports 172a,b induces the inflow to hug either an upper or lower wall 174,176 of the valve 170 under the coanda effect. This results in the flow entering the valve 170 down passage 178 or 180 respectively. If the flow is mainly down passage 178, then a high resistance vortex flow is induced in the valve, so that reduced outflow occurs through the outlet 182. However, if the flow is in passage 180, then a low resistance radial flow regime is established.

In application of the coanda valve 170 to fluid separators as described above, switching between the high and low resistance states is effected by arranging the valve to be monostable (ie only one control port 172a being employed).

The control part 172a is then supplied with the fluid being drained by the valve when that fluid level raises above a predetermined level in the vessel to switch the valve to its low resistance mode. Once the level drops back and the control flow ceases, the valve reverts to its stable, high resistance position.

Referring back to FIG. 8, $P_s$ is the pressure in the supply port 76 at the entrance to the vortex chamber 75 of the valve 72. [All pressures referred to hereinafter being relative to pressure outside the separator at the outlet to the valve, $P_o$]. Likewise, $P_c$ is the pressure in the control port 78 at the entrance to the vortex chamber. With flow entering only port 76, the interface level being below the inlet 78, $P_c$ is some fraction of $P_s$, say $xP_a$, ie $$P_c = xP_s \tag{1}$$

However, $$P_s = P_g + P_l \tag{2}$$

where $P_g$ is the gas pressure above ambient and $P_l$ is the pressure due to the hydrostatic pressure of the liquid above the exit of the separator. On the other hand, $$P_c = P_g + P_{cl} \tag{3}$$

where $P_{cl}$ is the hydrostatic liquid pressure which is less than $P_l$ due to some reduced level of the liquid in the control port due to the reduced level of $P_c$ compared with $P_s$.

Substituting (2) into (1) gives, $$P_c = xP_g + xP_l \tag{4}$$

Equating (3) and (4) gives, $$P_{cl} = xP_l - (1-x)P_g \tag{5}$$

Bearing in mind that, $$P_{cl} = h\rho g \tag{6}$$

where h is the height of the liquid column in 78 above separator exit, $\rho$ is the liquid density and g is the acceleration due to gravity, it follows that, $$h = (xP_l - (1-x)P_g)/\rho g \tag{7}$$

Of course, when $P_g$ is zero, ie the pressure in the vessel is ambient, the height of the liquid in the control port will vary directly with the level of the gas-liquid interface, from equation (7) above, and variations in $P_c$ versus $P_s$ will not have a substantial impact. When $P_g$ is substantially above $P_o$, however, it becomes especially important that x in equation (1) be as close to unity as possible, so that $P_c$ is as close to $P_s$ as possible. Otherwise, there is the danger of blow through of gas through the control port.

Steps which can be taken to ensure a large value of x include providing a smooth chamber periphery and equal port sizes at the entrance to the chamber of each control port. Moreover, the ducts or pipes to each entrance should be arranged to minimise energy losses, and also, of course to equalise energy losses, so that in full flow through each port there is complete, or close to complete, cancellation of their respective vortex inducing effects in the vortex chamber.

Figure 14:
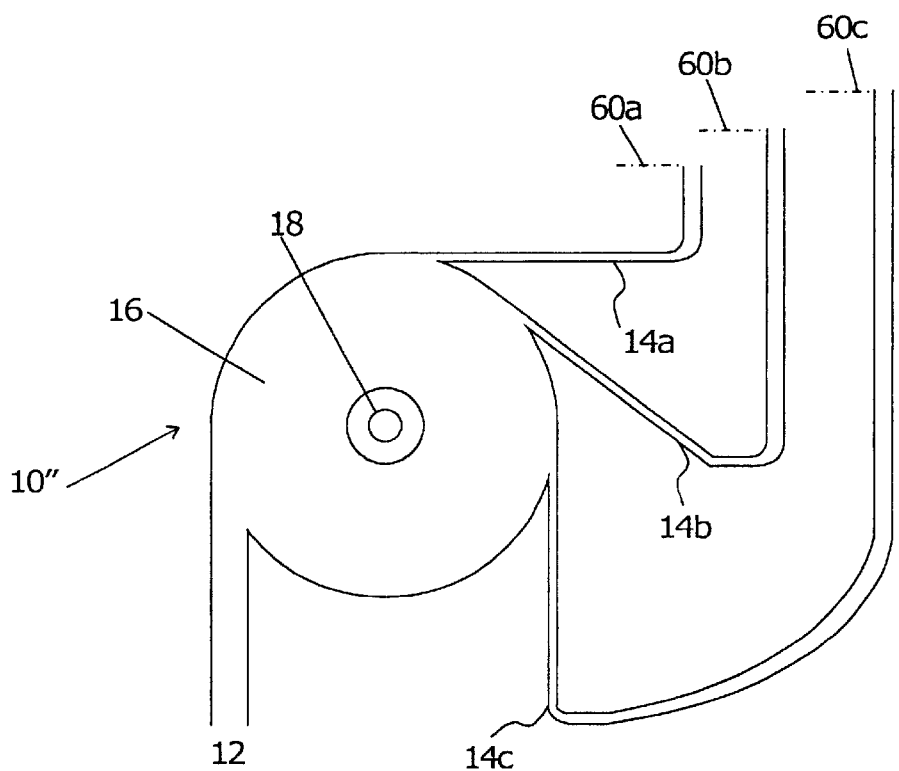
FIG. 14 shows a multiple port TuVA with staged inlet levels.

FIG. 14 shows a TuVA 10" with multiple control ports 14a,b,c, each becoming operational at increasing level 60a, b,c respectively of the reservoir fluid. This gives smoother transition between $Q_{min}$ and $Q_{max}$, and vice versa, which may be of benefit to downstream operation, eg pipework, vessels or a pump inducing outflow.

Figure 15:
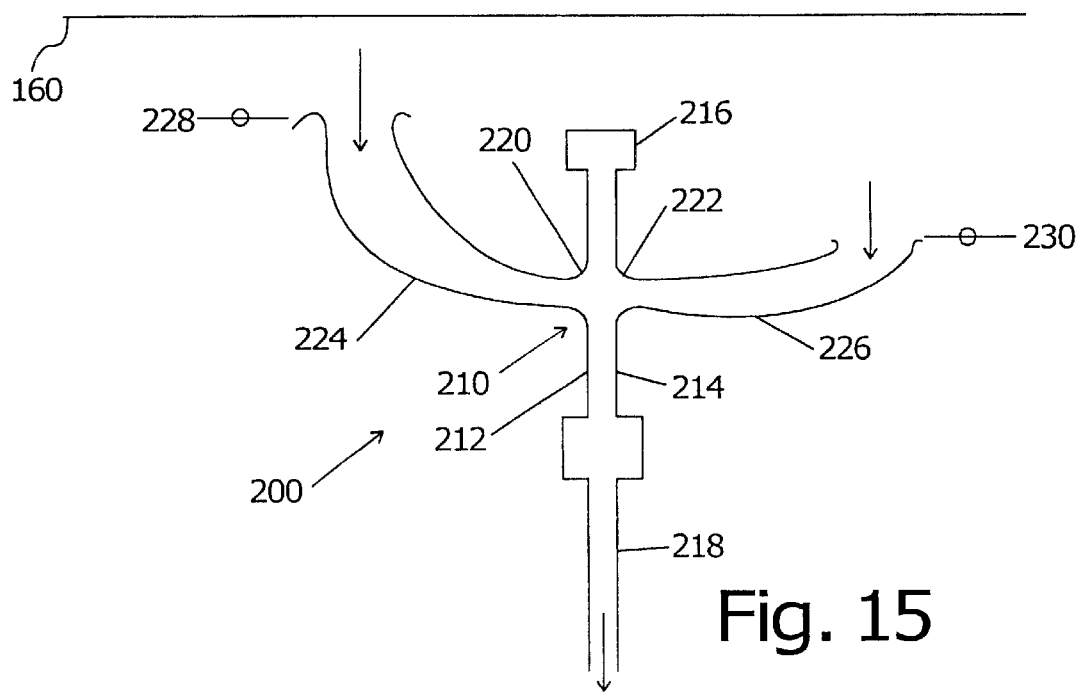
FIG. 15 shows a T-junction modulator employed in a further embodiment of the present invention.

FIG. 15 illustrates a T-junction modulator 200, being a form of fluidic valve which may also be employed to control fluid level 160. Here, a radial diffuser 210 comprises two circular discs 212,214 facing one another having an annular collection gallery 216 around their periphery. An outlet port 218 depends from the gallery 216. Centrally of each disc 212,214 is an orifice 220,222 to which is connected the narrow end of conical diffusers, forming control ports 224, 226.

Control port 224 is at a high level 228 in the reservoir (not shown) while port 226 is at a low level 230. When reservoir level 160 is above level 228, equal flow enters each port 224, 226 so that no effect is seen and flow through the conical diffusers 224,226 and radial diffuser 210 is at a maximum $Q_{max}$. However, when the level 160 drops below level 228, flow from the outlet 218 can only come from the control port 226. Such flow causes, however, oscillation in the other port 224, so the level in that port constantly changes and, instead of flowing through the radial diffuser 210, flow oscillates back and forth resisting flow through the radial diffuser 210 so that flow through the outlet 218 is reduced to a minimum $Q_{min}$.

Figure 16:
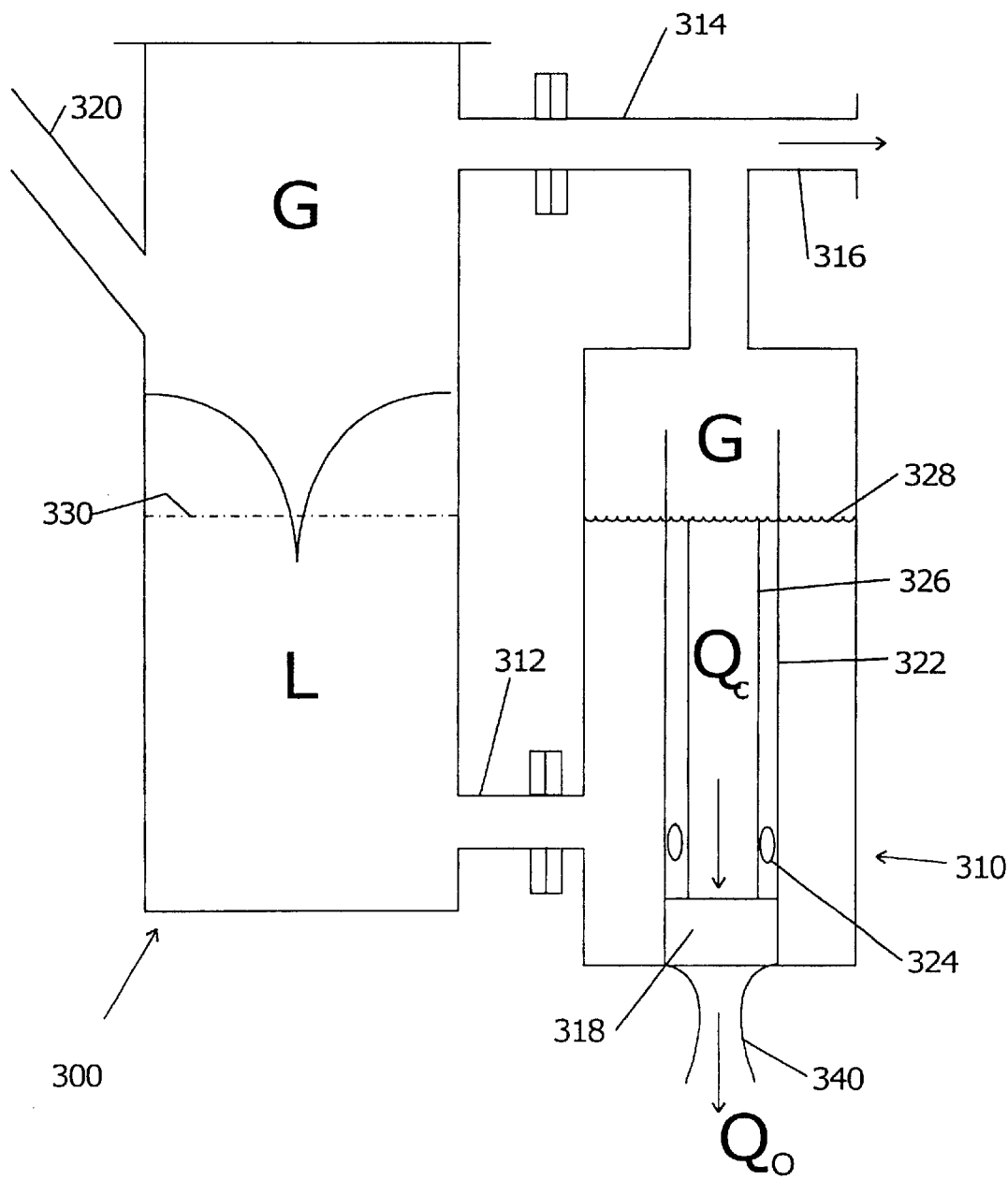
FIG. 16 shows a cyclone separator used in association with a system in accordance with the present invention.

FIG. 16 shows a cyclone separator 300 having a level control chamber 310 connected thereto by a liquid flange 312 and a gas flange 314. A branch 316 of the gas flange provides gas outflow, while a TuVA 318 provides liquid outflow. An inlet 320 to the cyclone separator, which has circular cylindrical housing, is tangential to the housing so that a swirling flow is induced in the liquid/gas mixture entering the separator through the inlet 320. Because of the swirling flow, separation of gas from liquid is enhanced as centripetal acceleration presses the heavier liquid to the outside of the separator, while light entrained gas is pushed to the centre. Nevertheless, such a separator also requires level control and the separate chamber 310 provides this.

A shroud 322 surrounds and rises above a turn-up vortex amplifier 318, windows 324 giving access to liquid in the chamber to the inside of the shroud, and from a relatively low level within the chamber so that the liquid at this level should have lost most of its gas.

Within the shroud 322, a first control port pipe 326 of the TuVA 318 rises to a level 328, which corresponds with the maximum desired level 330 in the separator 300. The second control port of the TuVA 318 communicates with the annular space between the shroud 322 and port 326. When liquid in the chamber 310 rises above the level 328, liquid spills over into the port 326 so as to equalise the flow through the two control ports. Thus the level is maintained as the rate of outflow through the outlet 340 of the TuVA is increased.

Figure 17:
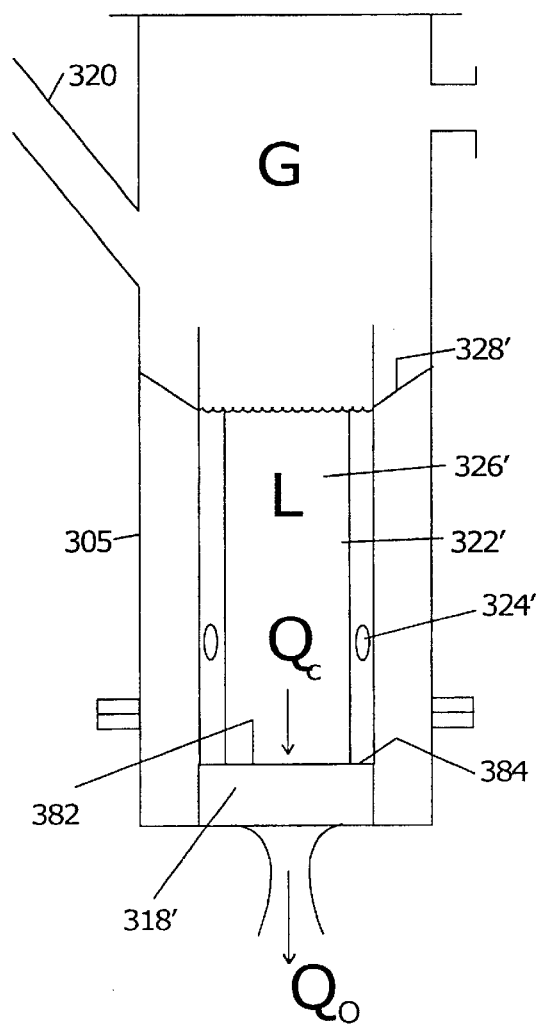
FIG. 17 shows a cyclone separator incorporating a TuVA.

In FIG. 17, the cyclone separator and level control chambers are integrated in a single chamber 305. The shroud 322' has apertures 324' supplying a first control port 284 of the TuVA 318' from well below surface level 328', and ensuring liquid of consistent quality flows through both control ports of the valve. The second control port 382 is only supplied when liquid spills over the control pipe 326' when the level in the separator 305 rises. A problem with this arrangement is that the cyclone effect is somewhat inhibited by the shroud 322'.

Figure 18:
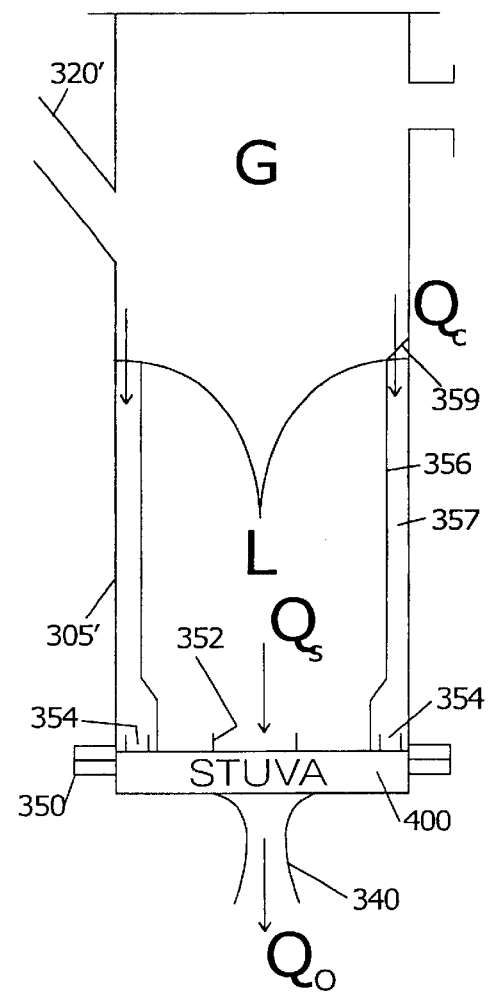
FIG. 18 shows a preferred variation of the arrangement in FIG. 17.

Finally, turning to FIG. 18, the arrangement here addresses the problem just mentioned because the shroud has been dispensed with and, instead, the central control port 352 of a TuVA 400 (as described further below) is provided with a wide bore inlet pipe 356.

Thus, the TuVA 400 has a central first control port 352 and a number of surrounding second control ports 354. Pipe 356 is disposed between the two ports, so that ports 354 only get flow when liquid spills over the pipe 356 into an annular space 357 defined between the pipe 356 and the wall of chamber 305'. However, inlet 320' is still oblique with respect to the chamber 305' and creates swirling flow in the interior of the pipe 356. Indeed, the annular space 357 may be closed as shown at 359 around part of the top of the space and where flow from the inlet 320' first impinges that space. The chamber 305' is a standard pipe having a flange 350 for connection of the TuVA 400

Referring now to FIGS. 19 to 23, a construction of a suitable TuVA 500 is shown and which could be employed in the systems described herein. The TuVA 500 comprises a series of plates bolted together by bolts schematically shown at 510,512 passing through holes 510a,512a in each plate in positions shown only in FIG. 23.

A first plate is a control plate 520 having a central aperture 522 and apertures 524 evenly spaced around. A first control port inlet pipe 526 may be secured in the central aperture, while second control port pipes, opening at a different level to the central pipe 526 (and optionally at different levels to each other—cf FIG. 14) may be connected to the apertures 524.

A second plate is a manifold plate 530 which has a central distribution chamber 532 communicating with the central aperture 522 and being provided with radially extending lumens 534. Each lumen 534 communicates with an axial passage 536 leading to the other side of the manifold plate 530. The plate 530 also has through-passages 538 communicating directly with each second control aperture 524, and an annular equalisation chamber 539 which surrounds the axial passages 536 and communicates the ports 524 with each other.

A third plate is a vortex plate 540 defining a central vortex chamber 542 and as many surrounding antechambers 544, 546 as there are, on the one hand, lumens 534 and axial passages 536, and on the other hand, second control port apertures 524 and through-passages 538. Each antechamber has a jet passage 548,549 communicating with the vortex chamber 542 and tangential with respect thereto. The jet passages 548 (ultimately all depending from the first control port 526) are all inclined in the same direction with respect to each other, and which is in opposition to the direction of inclination of all the jet passages 549 (ultimately all depending from equalisation chamber 539 and the second control ports 528).

Finally, a fourth plate is an outlet plate 550 having a central outlet 552 for connection of an outlet pipe 554. The outlet 552 is in communication with the vortex chamber 542.

Numerous advantages follow from this construction. Firstly, the axial alignment of the control ports 526,528 facilitates installation of the TuVA in an axially oriented environment in pipes and the like. Secondly, any one of the plates 520,530,540,550 can be extended radially as a flange for connection to the end of a pipe or a flanged connection of a vessel.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A pressure vessel containing a reservoir of fluid and having a valve controlling an outlet of the vessel and wherein there is a pressure differential across said valve beyond any hydrostatic pressure head of the reservoir fluid, the vessel comprising a system for the control of the level of reservoir fluid in the reservoir, the system comprising said valve being a fluidic valve and having an outlet port and at least two control ports either or both of which control ports may serve to inlet fluid into the fluidic valve, the inlets being arranged at different levels in the reservoir, whereby the valve has resistance to flow of fluid therethrough which is controlled by flow of said fluid into the control ports, such that said resistance is minimised when flow of fluid in the control ports is substantially equal, and wherein the flow out of the outlet is substantially equal to the combined flow into each control port.

2. A vessel as claimed in claim 1, wherein said valve is a vortex amplifier comprising a vortex chamber, said control ports being tangential with respect to said chamber and opposed with respect to each other, such that, when the fluid in the reservoir is between said levels, a vortex flow is induced in the vortex chamber increasing its resistance to flow, whereas when the fluid is outside said levels, flow through each control port is substantially the same so that no vortex is established in the vortex chamber whereby the resistance to flow through the valve is minimized.

3. A vessel as claimed in claim 2, in which more than two control ports are provided around said vortex chamber.

4. A vessel as claimed in claim 3, wherein at least two of said control ports are tangential in the same direction, their inlets in the reservoir being at different levels so that there is gradual switching between maximum and minimum resistances to flow through the valve and vice versa.

5. A vessel as claimed in claim 2, in which the valve has two axially opposed outlet ports.

6. A vessel as claimed in claim 2, in which an adjustable needle-valve is disposed in the valve so that it protrudes into the outlet port restricting outflow rate.

7. A vessel as claimed in claim 2, wherein the valve is arranged such that the pressure in one control port is at least 90%, of the pressure in the other port(s).

8. A vessel as claimed in claim 1, in which the control port, whose inlet is nearest the fluid level when both control ports have flow therethrough, is of sufficiently large diameter substantially to eliminate any risk of entrainment of an adjacent fluid in the flow of said reservoir fluid to the valve along said control port.

9. A vessel as claimed in claim 1, in which the valve has no other ports than said control and outlet ports.

10. A vessel as claimed in claim 1, in which the control ports are adapted to permit substantially equal flows, or flows which are optimized to reduce dynamic effects during operation.

11. A vessel as claimed in claim 1, wherein said valve comprises a T-junction modulator, wherein a radial diffuser has the narrow end of two conical diffusers, forming said control ports, communication with said radial diffuser substantially centrally thereof and on opposite sides thereof, said outlet port communicating with a collection gallery around said radial diffuser, whereby absence of supply of fluid to one control port results in oscillation of fluid across said radial diffuser and a high resistance to flow through the valve.

12. A vessel as claimed in claim 11, in which the control port, whose inlet is nearest the fluid level when both control ports have flow therethrough, is of sufficiently large diameter substantially to eliminate any risk of entrainment of an adjacent fluid in the flow of said reservoir fluid to the valve along said control port.

13. A vessel as claimed in claim 11, in which the valve has no other ports than said control and outlet ports.

14. A vessel as claimed in claim 11, in which the control ports are adapted to permit substantially equal flows, or flows which are optimized to reduce dynamic effects during operation.

15. A vessel according to claim 1, in which the valve (56) is located internally of the vessel.

16. A vessel as claimed in claim 1 comprising a fluid separation system for separating immiscible, different-density fluids, the system comprising the vessel which has an inlet for said fluids, and an outlet for each fluid disposed at different levels in the chamber, wherein said valve is a first valve, one of whose control ports comprises the outlet for one of said fluids, the other of said control ports being supplied from the vessel at a level intermediate said outlets so that a change in level of the interface between said fluids in the vessel about said intermediate level results in a change in the balance of flow in said control ports to alter the resistance to flow of fluid through said first valve.

17. A vessel as claimed in claim 16, in which, the fluid level control system is disposed in a separate level control chamber connected to the vessel both above and below the level of the interface between said fluids.

18. A vessel as claimed in claim 13, in which said fluids are a liquid and a gas, the vessel further comprising a second fluidic valve, the first valve controlling outflow of the liquid and the second valve controlling outflow of the gas.

19. A vessel as claimed in claim 18, in which said first and second valves have different intermediate levels and each intermediate level is located between the control ports of the other valve.

20. A vessel as claimed in claim 16, in which there are three fluids, being two liquids and a gas.

21. A vessel as claimed in claim 20, further comprising an intermediate fluidic valve, said first valve being a dense phase valve controlling outflow of the denser of said liquids, said intermediate valve having a supply port intermediate the supply and control ports of the first valve and a control port above the control port of the first valve.

22. A vessel as claimed in claim 16, further comprising a shroud around that control port of the or each valve which is nearest said intermediate level when there is balanced flow through both control ports, the shroud being disposed at a level near the level of the other control port.

23. A vessel as claimed in claim 22, in which the level of the shroud is such that only fluid of the same density as that entering said other port is able to enter the shrouded control port.

24. A vessel as claimed in claim 16, in which the separation vessel comprises a cyclone separator comprising a substantially circular cylindrical housing whose inlet is tangentially arranged so as to impart swirling flow on the mixed fluids entering the separator.

25. A vessel as claimed in claim 24, in which a separate level control chamber is provided incorporating said level control system, the control chamber being supplied at different levels with gas and liquid partially separated in said cyclone separator.

26. A vessel as claimed in claim 24, in which the level control system is disposed within the cyclone separator, and comprises a substantially circular cylindrical shroud centrally positioned in the cyclone separator so that swirling flow is outside said shroud, the shroud being apertured and one control port of the valve extending up the shroud.

27. A vessel as claimed in claim 24, in which the level control system is disposed within the cyclone separator, and comprises a control port pipe defining with the wall of the separator an annular control space, swirling flow in the separator being substantially confined to the interior of said pipe and one control port of the fluidic valve being supplied with liquid from inside the pipe, while the other port is supplied with liquid spilling over the pipe and into the annular space.

28. A vessel as claimed in claim 27, in which the annular space is closed off around part of its circumference to direct flow from the inlet into the interior of the pipe.

29. A vessel as claimed in claim 1, in which said valve is a turn-up vortex amplifier, comprising a vortex chamber, one or two axially arranged outlet ports, and two or more tangential control ports, such that inflow to the valve is substantially only through the control ports and outflow is substantially only through the or each outlet, at least two of the control ports being opposed to one another to reduce any vortex formation when flow occurs through both control ports from a common pressure source, and in which an adjustable needle-valve is disposed in the valve so that it protrudes into the, or one, outlet port restricting outflow rate.

30. A vessel as claimed in claim 1, in which said valve is a turn-up vortex amplifier comprising interconnected control, manifold, vortex and outlet plates defining axially arranged inlet control ports, a distribution manifold, a vortex chamber and an axially arranged outlet port respectively.

31. A vessel as claimed in claim 30, in which said control plate has a first control port which is centrally arranged, and a plurality of second control ports which are spaced around said central port.

32. A vessel as claimed in claim 31, in which said vortex plate comprises a plurality of antechambers spaced around said vortex chamber, each with a jet passage tangentially arranged with respect to, and connecting with, the vortex chamber in a direction depending on to which of said first and second control ports said antechambers are connected.

33. A vessel as claimed in claim 32, in which said manifold plate has a central distribution chamber on one side thereof, which side faces said control plate, radially spaced lumens leading off said distribution chamber and connecting with axial passages communicating with said other side of the manifold plate.

34. A vessel as claimed in claim 33, in which said manifold plate also has an annular equalization chamber on said other side, and which is supplied by through-passages communicating one with each of said second control ports.

35. A turn-up vortex amplifier valve comprising a vortex chamber, one or two axially arranged outlet ports, and two or more tangential control ports such that inflow to the valve is substantially only through the control ports and outflow is substantially only through the or each outlet, at least two of the control ports being opposed to one another to reduce any vortex formation when flow occurs through both control ports from a common pressure source, and in which an adjustable needle-valve is disposed in the valve so that it protrudes into the, or one, outlet port restricting outflow rate.

36. A turn-up vortex amplifier comprising interconnected control, manifold, vortex and outlet plates defining axially arranged inlet control ports, a distribution manifold, a vortex chamber and an axially arranged outlet port respectively.

37. An amplifier as claimed in claim 36, in which said control plate has a first control port which is centrally arranged, and a plurality of second control ports which are spaced around said central port.

38. An amplifier in claim 37, in which said vortex plate comprises a plurality of antechambers spaced around said vortex chamber, each with a jet passage tangentially arranged with respect to, and connecting with, the vortex chamber in a direction depending on to which of said first and second control ports said antechambers are connected.

39. An amplifier as claimed in claim 38, in which said manifold plate has a central distribution chamber on one side thereof, which side faces said control plate, radially spaced lumens leading off said distribution chamber and connecting with axial passages communicating with said other side of the manifold plate.

40. An amplifier as claimed in claim 39, in which said manifold plate also has an annular equalisation chamber on said other side, and which is supplied by through-passages communicating one with each of said second control ports.

\* \* \* \* \*